United States Patent
Fehrmann et al.

(10) Patent No.: US 7,758,782 B2
(45) Date of Patent: Jul. 20, 2010

(54) METHOD AND DEVICE FOR PRODUCING ELECTRODES FOR BATTERIES

(75) Inventors: Gerd Fehrmann, Pirna (DE); Thomas Fischer, Pirna (DE); Thomas Hucke, Dresden (DE); Roland Staub, Berggießhübel (DE); Jürgen Drews, Pirna (DE); Tim Traulsen, Pirna (DE)

(73) Assignee: Biotronik CRM Patent AG, Baar (CH)

( * ) Notice: Subject to any disclaimer, the term of this patent is extended or adjusted under 35 U.S.C. 154(b) by 295 days.

(21) Appl. No.: 11/608,111

(22) Filed: Dec. 7, 2006

(65) Prior Publication Data

US 2007/0132143 A1    Jun. 14, 2007

(30) Foreign Application Priority Data

Dec. 9, 2005    (DE) .................. 10 2005 059 375

(51) Int. Cl.
B29C 43/04    (2006.01)
B29C 43/18    (2006.01)

(52) U.S. Cl. .................. 264/104; 264/272.21; 264/273; 264/275; 264/279

(58) Field of Classification Search .............. 264/271.1, 264/272.21, 279, 273–278, 104
See application file for complete search history.

(56) References Cited

U.S. PATENT DOCUMENTS

| | | | | | |
|---|---|---|---|---|---|
| 3,271,195 A | * | 9/1966 | Berchielli et al. | ............ | 156/228 |
| 3,310,437 A | * | 3/1967 | Davee et al. | .................. | 429/94 |
| 3,332,801 A | * | 7/1967 | Holechek et al. | ............ | 429/219 |
| 3,409,474 A | * | 11/1968 | Kroeger et al. | ................ | 429/42 |
| 3,663,297 A | * | 5/1972 | Weller | ........................... | 419/8 |
| 3,920,479 A | * | 11/1975 | Westberg et al. | ............ | 264/104 |
| 4,118,552 A | * | 10/1978 | Chireau et al. | .............. | 429/219 |

(Continued)

FOREIGN PATENT DOCUMENTS

DE    11 83 149 A    7/1960

(Continued)

OTHER PUBLICATIONS

European Search Report, dated May 7, 2007.

(Continued)

*Primary Examiner*—Joseph S Del Sole
*Assistant Examiner*—Ryan Ochylski
(74) *Attorney, Agent, or Firm*—ARC IP Law, PC; Joseph J. Mayo (57) ABSTRACT

A method and device for producing a battery electrode (5) by: pouring a powder mixture quantity (6a) into a cavity (2), laying an electrically conductive diverter (4) on powder mixture (6a), pouring a further quantity (6b) of same powder mixture (6) into same cavity (2), and compressing the two powder mixture quantities (6a, 6b). The device has a filling cavity (2) for powder mixture (6), at least one compression means (1) for compressing powder mixture (6), and support (7) and fixing means (8) for positioning and fixing an electrically conductive diverter (4). The diverter (4) is situated so that partial quantities (6a, 6b) of powder mixture (6) are located above and below diverter (4). The support means (7) and fixing means (8) are situated in such a way that a ratio of the partial quantities (6a, 6b) of powder mixture (6) above and below the diverter (4) remains essentially maintained.

10 Claims, 7 Drawing Sheets

U.S. PATENT DOCUMENTS

| | | | |
|---|---|---|---|
| 4,178,339 A * | 12/1979 | Powell et al. | 156/89.17 |
| 4,236,927 A | 12/1980 | Buhl et al. | |
| 4,367,188 A * | 1/1983 | Warrell et al. | 264/104 |
| 4,368,167 A * | 1/1983 | Berchielli | 264/104 |
| 4,792,505 A * | 12/1988 | Moyes | 429/219 |
| 4,877,569 A * | 10/1989 | Urbish et al. | 264/221 |
| 5,004,657 A * | 4/1991 | Yoneda et al. | 429/304 |
| 5,387,478 A | 2/1995 | Muta et al. | |
| 6,727,022 B2 * | 4/2004 | Gan et al. | 429/128 |
| 7,431,875 B2 * | 10/2008 | Rule | 264/272.14 |
| 2001/0053473 A1 * | 12/2001 | Getz | 429/128 |
| 2005/0106907 A1 * | 5/2005 | Yamada et al. | 439/91 |
| 2005/0191545 A1 * | 9/2005 | Bowles et al. | 429/127 |
| 2005/0252603 A1 * | 11/2005 | Rule | 156/245 |
| 2006/0024567 A1 * | 2/2006 | Heller et al. | 429/128 |
| 2007/0266554 A1 * | 11/2007 | Bruce | 29/623.3 |
| 2007/0292600 A1 * | 12/2007 | Morgan | 427/58 |
| 2008/0116609 A1 * | 5/2008 | Darke | 264/271.1 |

FOREIGN PATENT DOCUMENTS

| | | |
|---|---|---|
| DE | 12 25 722 A | 9/1961 |
| DE | 77 07 702 U1 | 3/1977 |
| EP | 0307209 A1 | 3/1989 |
| GB | 1073294 A | 6/1967 |
| JP | 58111261 A | 7/1983 |
| WO | WO 02052664 | 7/2002 |

OTHER PUBLICATIONS

German Search Report, dated Mar. 27, 2006.

* cited by examiner

METHOD AND DEVICE FOR PRODUCING ELECTRODES FOR BATTERIES

This application takes priority from German Patent Application DE 10 2005 059 375.5 filed 9 Dec. 2005 the specification of which is hereby incorporated herein by reference.

BACKGROUND OF THE INVENTION

1. Field of the Invention

The present invention relates to a powder pressing method for producing battery electrodes and an associated pressing device.

2. Description of the Related Art

Such production methods are known from the prior art. Firstly, battery electrodes are produced by wet coating methods. In these methods, the powder is dispersed together with a binder in a solvent. The solvent is selected for this purpose so that it wets the components of the powder sufficiently and simultaneously has a sufficiently high solubility for the binder. Aqueous dispersions or dispersions based on organic solvents (e.g., alcohols, ketones, amines, amides, ethers) are used for this purpose. These dispersions are applied to an electrically conductive carrier (e.g., metals, conductively coated polymers) and the solvent is removed by drying.

The disadvantages of this method are manifold. The production of the dispersions is time-consuming and costly and the useful lives of the dispersions are frequently limited by coagulation or sedimentation. Furthermore, secondary reactions occur due to the decomposition of the solvent(s), possibly also due to secondary reactions with the dispersed substances or with the dissolved binders. These lower the useful lives of the coating solutions. Disadvantages arise both with aqueous coating solutions and also with organic solvents. Aqueous coating solutions are nontoxic, but may only be dried with difficulty. Long drying times or high drying temperatures are necessary. Moisture-sensitive materials may not be coated by aqueous solvents. Organic solvents typically require a high technical outlay (explosion protection, fire protection, solvent reclamation/solvent combustion). The requirements for labor protection (toxicity, annoyance due to bad smells) are typically high. Quantitative reclamation is typically not possible. The production of homogeneous coatings is technically demanding and costly because of the rheological properties of the dispersions and the drying of such coatings produces high energy costs and is time-consuming.

Above all in lithium batteries, the selection of the binders stable under the operating conditions of the battery is limited. Often, only fluorinated polymers are usable. These are frequently only soluble in special, expensive organic solvents having high boiling points. The solvents increase the porosity of the coating during the drying process. To increase the energy density of the coating, additional work steps are therefore necessary after the drying to compact the electrodes (pressing, calendering).

Further methods known from the prior art are pressing methods. In these methods, powder mixtures are compressed to form tablets, rings, or cups (pressed parts). The powder mixtures may also be processed to form strands or films by extrusion. The electrical discharge of the current occurs in this case by laminating on a metallic diverter, possibly with the aid of an electrically conductive adhesive. The contact may also be produced by a simple press contact. The discharge is frequently ensured by a press contact with the housing of the battery or by a nail which is driven into the pressed part.

These methods also have disadvantages. The contact areas of the pressed parts for the press contacting are typically small, the carrying capacity of the batteries is limited. Furthermore, disadvantages have been established if a homogeneous material bond is not produced between the electrically conductive diverter and the housing (e.g., by welding). The transition resistance of the press contact may then rise in the course of the battery life due to the formation of cover layers, due to gas development, or due to corrosion. A rise of the transition resistance of press contact has also been established when the pressure which acts on the press contact is reduced in the course of the battery life. The causes of this may, for example, be an expansion of the housing due to swelling of the battery materials or due to gas development.

In hermetically sealed batteries, in which no polymer seals could be used for sealing and insulating housing parts, only one electrode may be electrically connected by a press contact. The other electrode must be electrically connected to the battery housing using a bushing insulated from the battery housing (e.g., a glass-metal bushing). A connection of the electrode to an electrically conductive diverter (e.g., wire, film, grid) is required for this purpose.

A further grave disadvantage is the low mechanical stability of the pressed parts. Because of this disadvantage, there must be a sufficiently high wall thickness according to the prior art. This results in a low electrical carrying capacity of the battery. For mechanical stabilization, the pressing method may be performed directly in the battery housing (e.g., with alkali-manganese batteries). This requires sufficient material thicknesses of the housing and is bound to suitable housing geometries (cylindrical housing). It has also been shown that laminating on an electrically conductive diverter represents an additional time-consuming and costly work step.

Manifold powdered materials and/or mixtures of powdered materials are used to produce battery electrodes. These are coated on an electrically conductive material, which is used as the current diverter. The powdered materials are therefore preferred because they form porous structures having a large surface in relation to the ion-conducting electrolytes. A high carrying capacity of the battery electrode per unit area is thus achieved.

BRIEF SUMMARY OF THE INVENTION

The present invention has the object of providing the development of a novel method and a device for producing battery electrodes from powder mixtures, which corrects the disadvantages known from the prior art.

The object is achieved as claimed herein.

Firstly, a powder mixture to produce a positive and/or negative battery electrode is provided in a filling cavity—preferably a matrix—and an electrically conductive diverter is then laid on this powder mixture. A further quantity of the same powder mixture is applied to this diverter. Finally, the powder mixture is compressed with the electrically conductive diverter under pressure.

The electrically conductive diverter is preferably an etched, embossed, or stamped metallic grid or a grid made of stretched metal. However, any other suitable shape and/or any other suitable material may also be provided for the electrically conductive diverter.

In a further method variation, an electrically conductive diverter in the form of a metallic grid is first positioned in a filling cavity and the powder mixture is then provided. The powder mixture then flows through the grid of the electrically conductive diverter and forms a predefined quantity of the powder mixture above and below the grid. Finally, the compression under pressure is performed.

The advantages of this method are, inter alia, that no solvent is necessary in the production of the electrodes. The drying of the electrodes is thus dispensed with, since the powdered starting materials used already have the moisture required for the later application.

Furthermore, it is now possible to produce very thin electrodes with a low binder content.

One advantage of the present invention is the connection of an electrically conductive diverter to the pressed part. A method is described for integrating an electrically conductive diverter directly into a powder mixture, without lamination.

A further advantage is that no additional work steps are required for compressing the electrode and the electrode is connected to the electrically conductive diverter in one work cycle. This method according to the present invention also allows the stabilization of the geometry by the electrically conductive diverter.

A further component of the present invention is a device which allows parts of an electrically conductive diverter not to be coated during the compression procedure. The device comprises a filling cavity, into which the powder mixture is poured to produce a positive and/or negative battery electrode. The powder mixture is pressed together with an electrically conductive diverter and shaped into a battery electrode by compression means, which preferably comprise an upper plunger and especially preferably an upper plunger and a lower plunger.

The electrically conductive diverter comprises parts to be coated and parts not to be coated. The parts to be coated are to be coated by the powder pressing. In order to protect parts of an electrically conductive diverter not to be coated from coating and damage occurring due to the pressing, the electrically conductive diverter is positioned in a support and a counter support. The support and the counter support preferably comprise pins, the support being formed by a spring-mounted pin. The section of the electrically conductive diverter not to be coated is laid on the support and then covered by the further pin. The support is laid out so that it may change position with the height changes occurring during the pressing and the ratio of the heights of the partial quantities of the powder mixtures above and below the electrically conductive diverter thus remains essentially maintained during the compression procedure.

In a further embodiment, the device comprises a two-part filling cavity in the form of two matrices, between which the electrically conductive diverter is positioned. In this embodiment, a symmetrical pressing is performed by two compression means in the form of an upper plunger and a lower plunger. The electrically conductive diverter lying between the two matrices is pressed together from both sides with the powder mixture.

The advantage of the device in relation to the prior art is that no waste and no scrap are possible. The production allows complex geometries, outstanding shaping, and high mechanical stability of the battery electrodes. Furthermore, high working speeds are possible.

BRIEF DESCRIPTION OF THE DRAWINGS

In the following, the present invention is explained in greater detail on the basis of exemplary embodiments and the associated drawings:

FIG. 1 shows an illustration of a compression press and the methods of asymmetrical and symmetrical pressing from the prior art.

FIG. 2 shows a schematic illustration of the powder pressing method using prepressed pressed parts and subsequent pressing together with an electrically conductive diverter.

FIG. 3 shows a preferred method according to the present invention for pressing a battery electrode.

FIG. 4 shows a further preferred method according to the present invention for pressing a battery electrode.

FIG. 5 shows a device for producing battery electrodes comprising a spring-mounted support and a counter support for performing asymmetrical pressing.

FIG. 6 shows a device for producing battery electrodes comprising a divided filling cavity made of two matrices for performing symmetrical pressing.

DETAILED DESCRIPTION

The powder mixture comprises—as known from the prior art—the active material of the particular battery electrode, conductivity additives, a polymer binder and/or mixtures of various binders, and possibly additives.

In principle, all electrode materials which may be produced in the form of a powder are suitable as active materials. Both active materials for producing cathodes and also active materials for producing anodes may be used. The active materials may be suitable both for producing primary batteries (i.e., non-rechargeable batteries) and also for producing secondary batteries (i.e., rechargeable batteries).

Examples of suitable active materials for cathodes are manganese dioxide, doped manganese dioxide, copper oxyphosphate, iron phosphate, lithium-cobalt oxides, lithium-nickel-cobalt oxides, boron-doped or aluminum-doped lithium-cobalt oxides or lithium-nickel-cobalt oxides, silver-vanadium oxide, or fluorinated carbon compounds.

Examples of suitable active materials for anodes are carbon compounds such as graphites, or mesocarbon compounds, and silicon or lithium-titanates.

The use of active materials having particle sizes >10 µm and <70 µm is especially preferred.

For example, spherical, potato-shaped, needle-shaped, or plate-shaped graphites, carbon blacks, expanded graphites, or metal powder are suitable as conductivity additives. Expanded graphites are especially suitable.

The use of conductivity additives having particle sizes >50 nm and <10 µm is especially preferred.

Fluorinated polymers are preferably used as binders of powder-based electrode materials in lithium batteries because of their high thermal and chemical resistance. Typical polymers are, for example, polytetrafluorethylene (PTFE) or polyvinylidene fluoride (PVDF). In order to achieve the highest possible energy density of the battery—i.e., the highest possible concentration of active materials—the binder content is selected as low as possible. The binder concentration is selected in such a way that the required mechanical stability of the electrode and the adhesion of the powder mixture to the electrically conductive diverter are ensured. Perfluorinated polymers such as polytetrafluoroethylene (PTFE) or partially-fluorinated polyolefins such as polyvinylidene difluoride (PVDF) are preferably suitable.

The use of binders having particle sizes <10 µm is especially preferred.

Additives are not required for the method described here. However, they may be added to positively influence the properties of the powder mixture, such as the flow behavior, or the properties of the electrodes, such as the porosity. In principle, for example, nanoscale silicon or titanium dioxides are suitable.

Figure 1A:
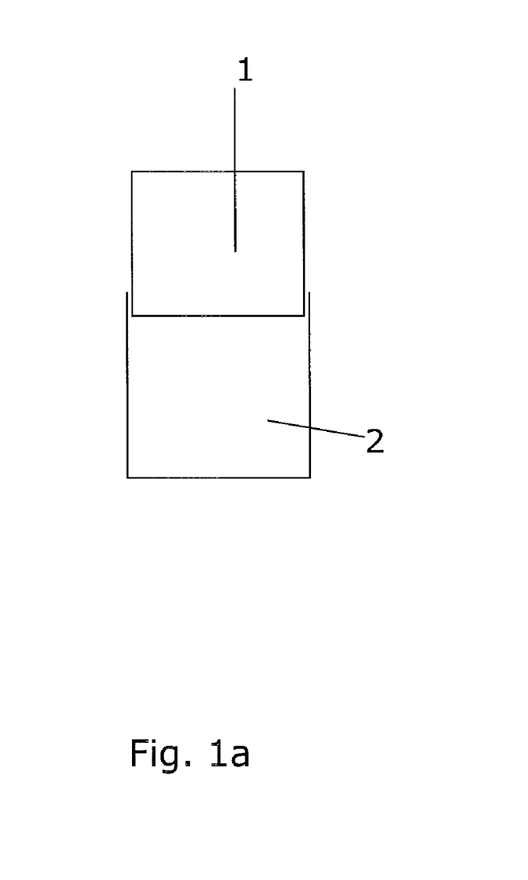
Figure 1B:
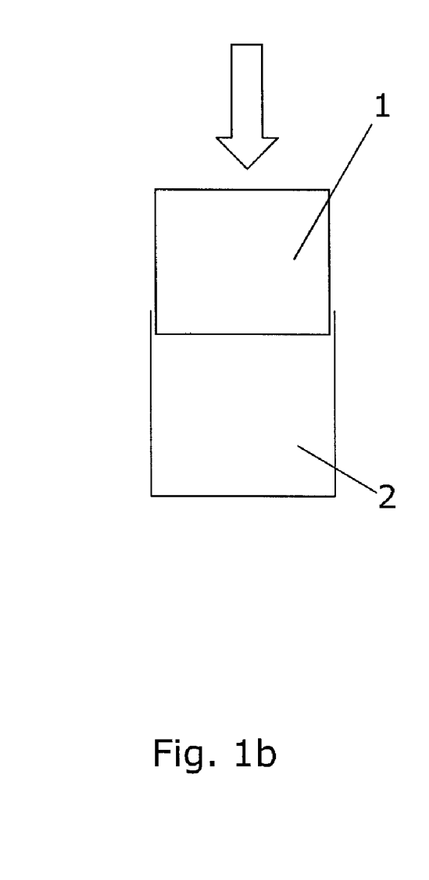
Figure 1C:
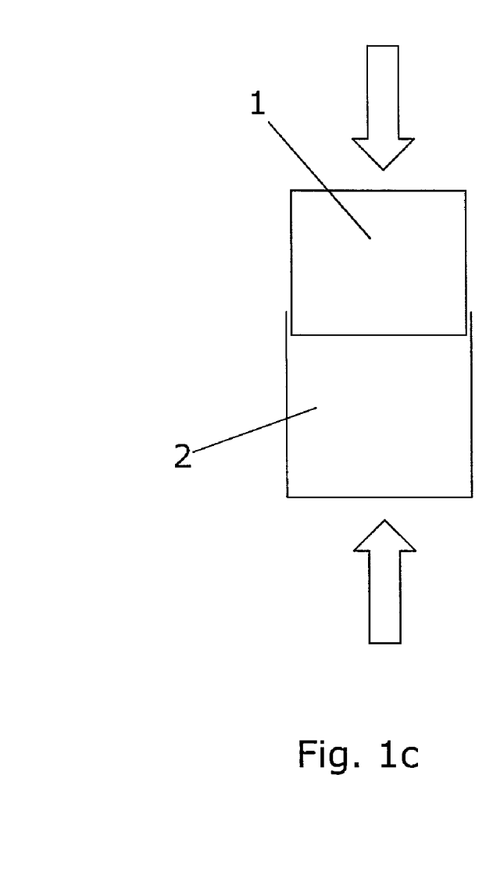

FIGS. 1a through 1c show the compression possibilities of the powder using a plunger-matrix method. The plunger (1) and the matrix (2) are shaped in the desired electrode geometry. Round, rectangular, polygonal, oval, semi-oval, or any other suitable geometries are possible.

The matrix (2) is filled with the powder mixture. The filling is performed either volumetrically or gravimetrically. The powder is compressed either solely by exerting pressure on the plunger (1) (asymmetrical compression)—as shown in FIG. 1b—or by simultaneously pressing together matrix (2) and plunger (1) (symmetrical compression), as shown in FIG. 1c. Symmetrical compression is preferred. Forces between 40 and 200 N/cm² are used for the compression.

Figure 2A:
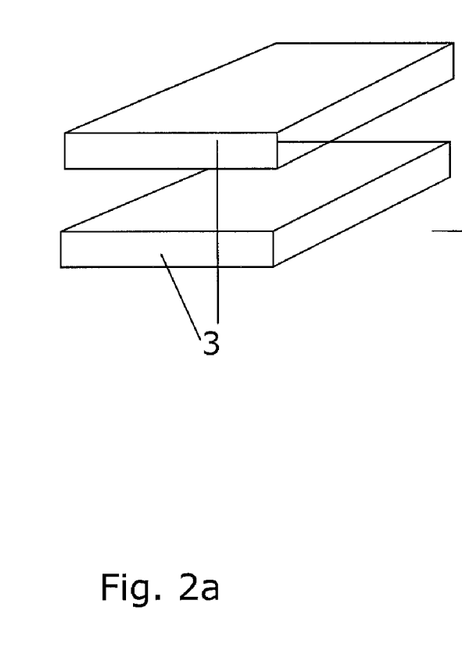
Figure 2B:
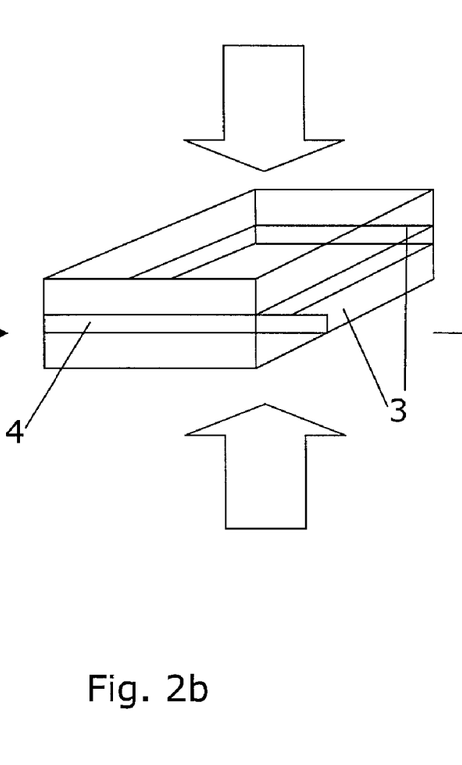
Figure 2C:
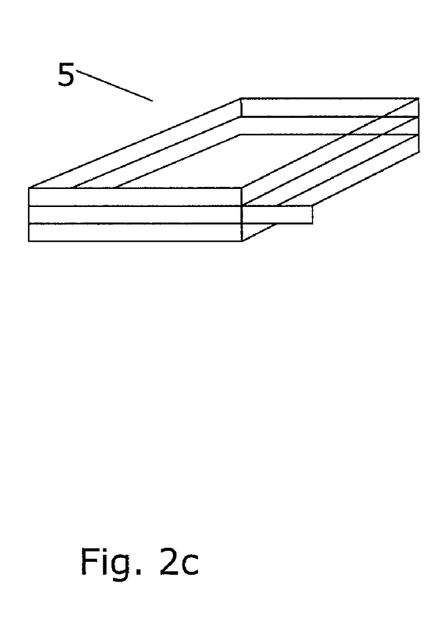

FIGS. 2a through 2c show the schematic sequence of the production of a battery electrode according to the method described, by first producing two homogeneous pressed parts (3). An electrically conductive diverter (4), preferably an etched, embossed, or stamped metallic grid or a grid made of stretched metal, is laid between the pressed parts (3). In contrast to the prior art cited, the two pressed parts are not glued to the electrically conductive diverter, but rather the two pressed parts (3) are compressed with the grid to form a unit (5) in a pressing procedure.

Figure 5A:
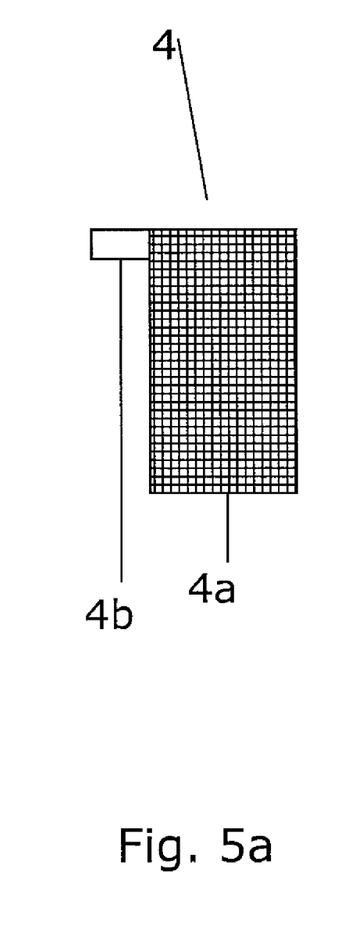
Figure 6A:
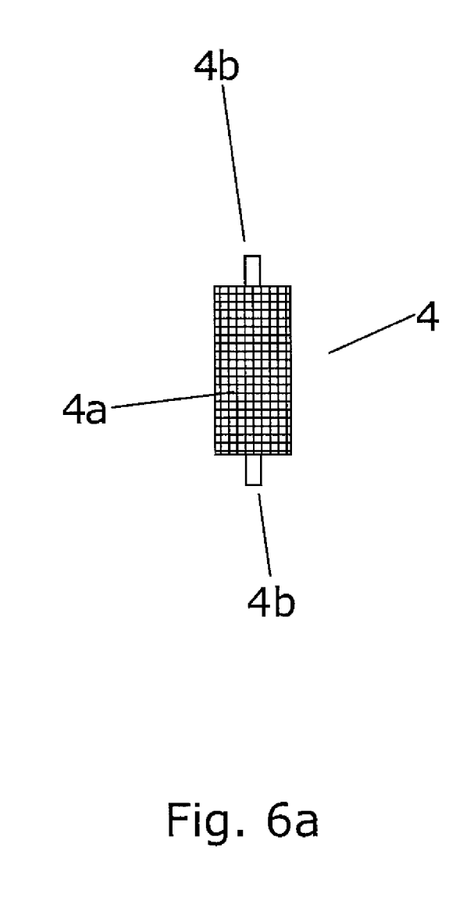

The electrically conductive diverter is shown more precisely in FIGS. 5a and 6a. The electrically conductive diverter (4) is formed by a part (4a) to be coated, which is covered by pressed powder mixture, and one or more parts (4b) not to be coated. The part (4a) to be coated is preferably an etched, embossed, or stamped metallic grid or a grid made of stretched metal. The parts (4b) not to be coated are implemented as "contact tabs" or any other suitable contact capability. Electrically conductive contacts to the battery housing or to a bushing of the battery may be produced using these parts (4b) not to be coated, e.g., by welding.

Figure 3A:
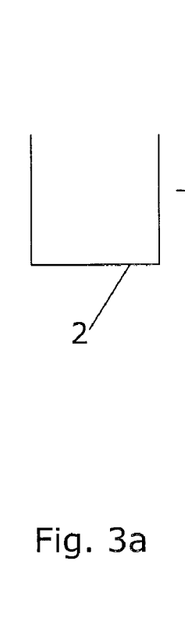
Figure 3B:
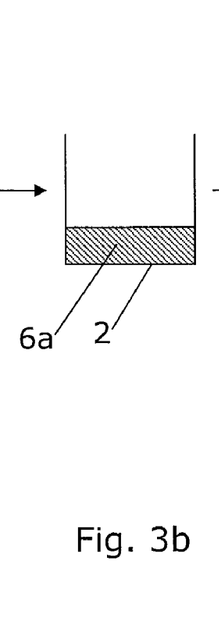
Figure 3C:
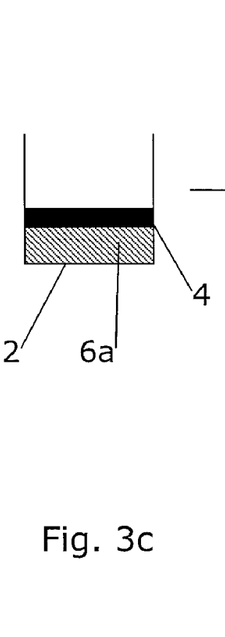
Figures 3D, 3E:
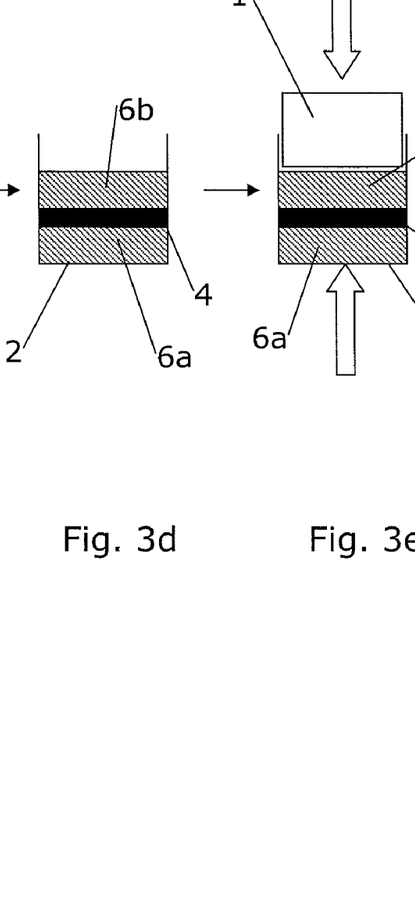
Figure 3F:
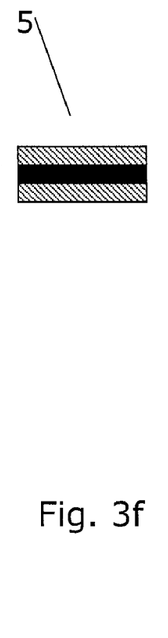

FIGS. 3a through 3f show a preferred method sequence for producing a battery electrode. Firstly, only half of the powder quantity (6a) which is required for the battery electrode (5) is dosed into a filling cavity (2)—preferably a matrix (FIG. 3b). The electrically conductive diverter (4), preferably an etched, embossed, or stamped metallic grid or grid made of stretched metal, is laid in the matrix (2) (FIG. 3c) and the other half of the powder quantity (6b) which is required for the electrode is then dosed into the matrix (2) (FIG. 3d). Subsequently, the powder quantity is compressed with the electrically conductive diverter (4), which is preferably positioned centrally, with the aid of the compression means (1) (FIG. 3e) and a battery electrode (5) is thus produced (FIG. 3f).

To prevent "sinking" of the electrically conductive diverter (4) into the loose powder mixture (6), the powder mixture (6) may be precompressed at low pressure by a pressing procedure after the first dosing procedure.

Figure 4A:
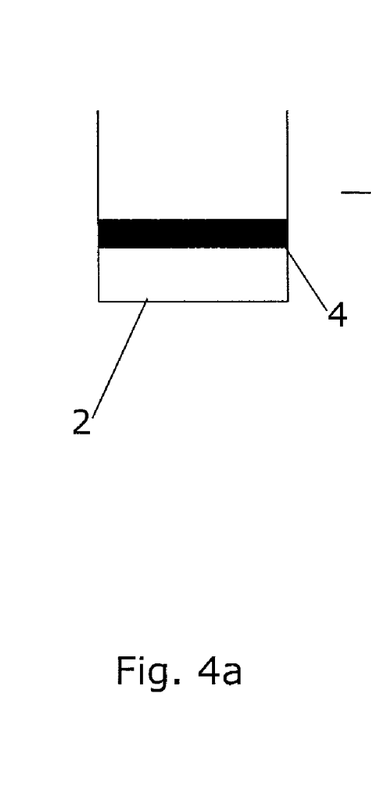
Figure 4B:
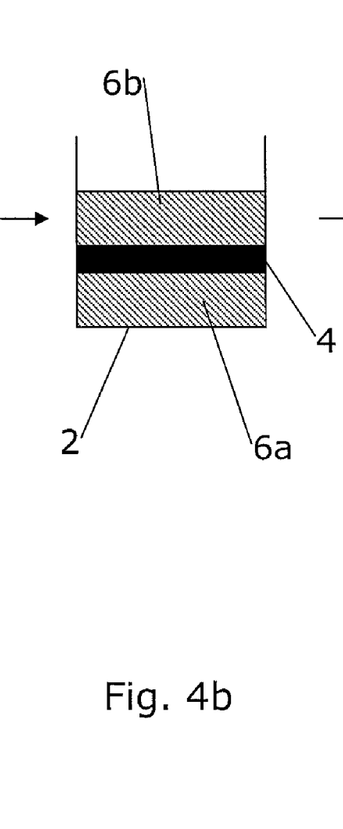
Figure 4C:
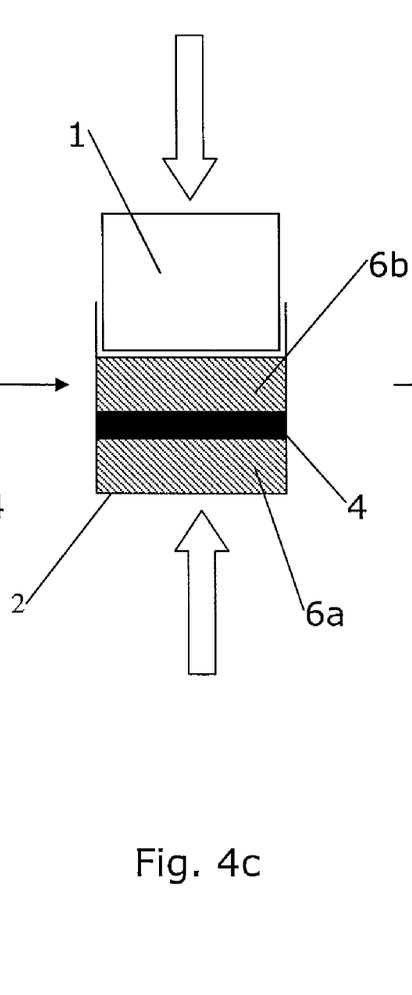
Figure 4D:
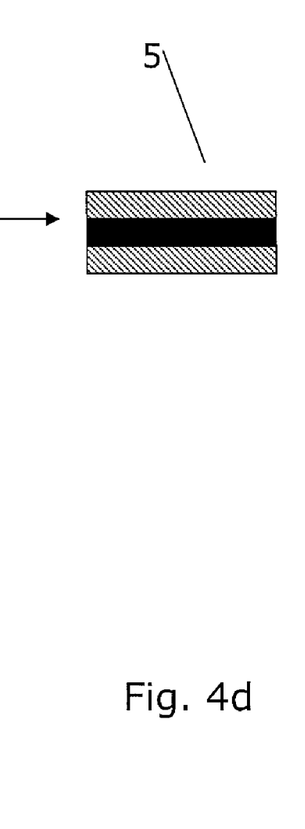

FIGS. 4a through 4d show a further pressing method according to the present invention. The electrically conductive diverter (4), preferably an etched, embossed, or stamped metallic grid or a grid made of stretched metal, is positioned in the matrix (2) (FIG. 4a). The powder quantity (6) that includes powder quantity (6a) and (6b) required for the electrode is dosed in its entirety into the matrix (2), half of the powder (6b) flowing through the electrically conductive diverter (2) (FIG. 4b). The powder quantity (6), i.e., (6a) and (6b) is then compressed asymmetrically with the aid of compression means (1) (FIG. 4c). After the demolding, the battery electrode (5) is obtained.

Figure 5B:
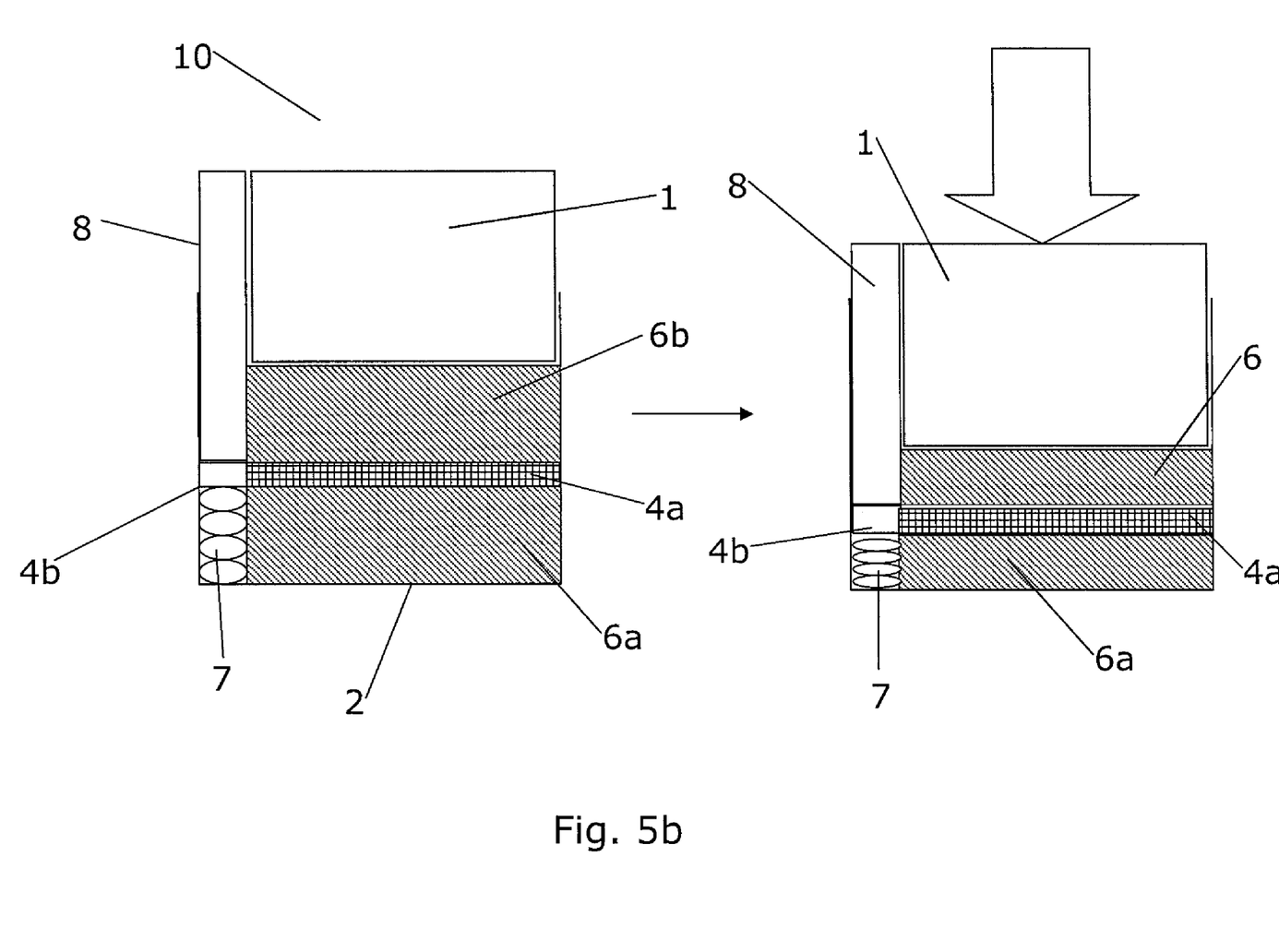

FIG. 5b shows an embodiment according to the present invention of a device (10) for producing a battery electrode, using which the asymmetrical pressing method which is described in FIG. 3 or 4 may be performed. The part (4b) of the electrically conductive diverter (4) not to be coated is laid on the spring-mounted support means (7). A fixing means (8) is laid on the part (4b) of the electrically conductive diverter (4) not to be coated, which lies on the spring-mounted support means (7), so that the area of the part (4b) of the electrically conductive diverter (4) not to be coated is covered both from above and also from below. The powder (6) to be compressed may either be poured in halfway before the electrically conductive diverter (4) is inserted or even—if the diverter is a grid—may be poured through the electrically conductive diverter (4).

Both the support means (7) and also the fixing means (8) may comprise a pin, the pin of the support means (7) being spring-mounted and mounted so it is vertically displaceable.

During compression of the powder mixture (6) using a plunger (1), the spring-mounted support (7) is pressed in far enough to correspond to the compression of the powder mixture (6). This ensures that the part (4b) of the electrically conductive diverter (4) not to be coated always remains positioned in the plane of the diverter (4) and is not bent during the compression of the powder mixture (6).

Figure 6B:
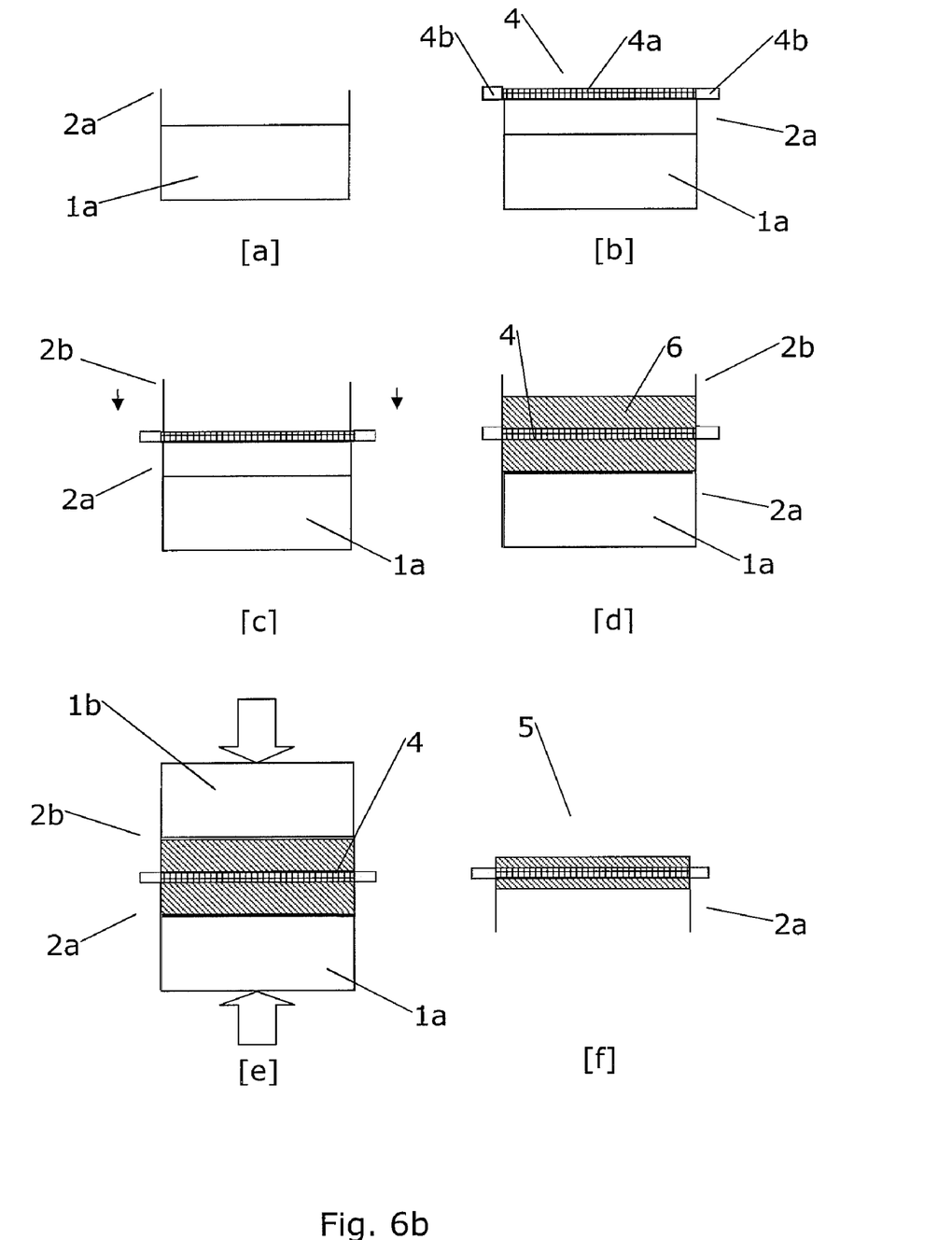

FIG. 6b shows a further embodiment of the device for producing a battery electrode, using which the symmetrical pressing method shown in FIG. 1c may preferably be performed. A multipart matrix (2a and 2b) may be used during the pressing procedure. The compression is performed for this purpose using two compression means. The lower plunger (1a) is inserted into the lower matrix (2a) [a]. The electrically conductive diverter (4), preferably an etched, embossed, or stamped metallic grid or grid made of stretched metal, is laid on the lower matrix (2a) in such a way that the parts (4b) of the electrically conductive diverter (4) not to be coated lie on the upper edge of the lower matrix (2a) [b]. The upper matrix (2b) is placed on the lower matrix (2a). The top of the bottom matrix (2a) and the bottom of the top matrix (2b) of the matrices are shaped so that the "tabs" (4b) are enclosed in the mold [c]. The closed multipart matrix (2) is filled with the powder mixture (6) [d]. The upper plunger (1b) is subsequently put on and the powder mixture (6) is symmetrically compressed by moving the upper and lower plungers (1a and 1b) toward one another under force [e]. Finally, the plungers (1a) and (1b) are drawn back and the upper part of the matrix (2b) is removed. The pressed battery electrode (5) may be removed. [f] shows the finished battery electrode lying on the lower matrix (2a) of the multipart matrix (2).

What is claimed is:

1. A method for producing a battery electrode comprising the following steps:

laying an electrically conductive diverter (4) with one or more parts (4b) not to be coated in a cavity that is empty and laying said one or more parts (4b) not to be coated onto a matrix (2a) formed as support means (7) wherein said electrically conductive diverter lies in a horizontal plane;

laying a further matrix (2b) formed as fixing means (8) onto said one or more parts (4b) of said electrically conductive diverter (4) not to be coated;

pouring a quantity of powder mixture on said electrically conductive diverter from above said electrically conductive diverter wherein said powder mixture is dry and wherein approximately half of said quantity of powder mixture flows downward through said electrically conductive diverter and into a bottom portion of said cavity below said electrically conductive diverter; and, compressing a two powder mixture comprising said powder mixture that is situated above and which has partially flowed through said electrically conductive diverter to form a battery electrode.

2. The method according to claim 1 wherein said powder mixture comprises:
   an active material for producing battery electrodes;
   conductivity additives; and,
   a polymer binder.

3. The method according to claim 1 wherein said electrically conductive diverter is an etched and/or embossed and/or stamped metallic grid or a grid made of stretched metal.

4. The method according to claim 1 wherein said battery electrode is produced without using solvents.

5. The method according to claim 1 wherein said battery electrode is produced without drying.

6. The method according to claim 1 wherein said battery electrode is produced without gluing.

7. The method according to claim 1 further comprising preventing contact of said powder mixture with a portion of said battery electrode to form a contact tab on said battery electrode.

8. A method for producing a battery electrode comprising the following steps:

placing an electrically conductive diverter in a cavity that is empty wherein said electrically conductive diverter lies in a horizontal plane;
   placing a quantity of powder mixture on top of said electrically conductive diverter wherein said powder mixture is dry and wherein approximately half of said quantity of powder mixture flows downward through said electrically conductive diverter and into a bottom portion of the cavity; and,
   compressing the powder mixture onto said electrically conductive diverter to form a battery electrode.

9. The method according to claim 8 further comprising preventing contact of said powder mixture with a portion of said battery electrode to form a contact tab on said battery electrode wherein said portion of said battery electrode is placed on a support that is laid out so that said support may change position with height changes occurring during the compressing and wherein a ratio of heights of partial quantities of the powder mixture above and below the electrically conductive diverter thus remains essentially maintained during the compressing.

10. The method according to claim 8 wherein said battery electrode is produced without using solvents, drying or gluing.

* * * * *